(12) United States Patent
Chen et al.

(10) Patent No.: US 6,992,904 B2
(45) Date of Patent: Jan. 31, 2006

(54) POWER CONVERTER MODULE WITH A VOLTAGE REGULATING CIRCUIT

(75) Inventors: Chien-Jung Chen, Kaohsiung Hsien (TW); Hui-Chao Hsu, Kaohsiung (TW)

(73) Assignee: Yen Sun Technology Corp., Kaohsiung Hsien (TW)

( * ) Notice: Subject to any disclaimer, the term of this patent is extended or adjusted under 35 U.S.C. 154(b) by 144 days.

(21) Appl. No.: 10/668,329

(22) Filed: Sep. 24, 2003

(65) Prior Publication Data

US 2004/0257844 A1    Dec. 23, 2004

(30) Foreign Application Priority Data

Jun. 23, 2003   (TW) .............................. 92211414 U

(51) Int. Cl.
*H02M 1/12*    (2006.01)

(52) U.S. Cl. ........................................ 363/45; 363/126

(58) Field of Classification Search ................. 363/19, 363/45, 81, 84, 86, 125, 126; 361/503, 674, 361/821; 73/40.5 R
See application file for complete search history.

(56) References Cited

U.S. PATENT DOCUMENTS

| | | | | |
|---|---|---|---|---|
| 5,047,893 | A | * | 9/1991 | Farrall et al. ................ 361/821 |
| 5,637,789 | A | * | 6/1997 | Lawson ................... 73/40.5 R |
| 6,295,212 | B1 | * | 9/2001 | Kayser et al. ................. 363/19 |
| 6,426,863 | B1 | * | 7/2002 | Munshi ....................... 361/503 |

* cited by examiner

*Primary Examiner*—Jessica Han
(74) *Attorney, Agent, or Firm*—Foley & Lardner LLP

(57) ABSTRACT

A power converter module provides a regulated direct current voltage to a load, and includes a rectifier, a metal thin film capacitor, and a voltage regulating circuit. The rectifier has input rectifier terminals coupled electrically to an external alternating current power source, and output rectifier terminals. The metal thin film capacitor interconnects one of the input rectifier terminals of the rectifier to the external alternating current power source. The voltage regulating circuit provides the regulated direct current voltage from the output rectifier terminals to the load.

8 Claims, 2 Drawing Sheets

POWER CONVERTER MODULE WITH A VOLTAGE REGULATING CIRCUIT

CROSS-REFERENCE TO RELATED APPLICATION

This application claims priority of Taiwanese application no. 092211414, filed on Jun. 23, 2003.

BACKGROUND OF THE INVENTION

1. Field of the Invention

The invention relates to a power converter module, more particularly to a power converter module with a voltage regulating circuit for use in a fan assembly.

2. Description of the Related Art

A conventional power converter module, which provides an unregulated direct current voltage to a direct current brushless fan motor, includes a rectifier, a metal thin film capacitor, a filter capacitor, and a limiting resistor.

The rectifier has first and second terminals coupled electrically to an external alternating current power source, a third terminal connected electrically to a first node, and a fourth terminal connected electrically to a grounded node. The metal thin film capacitor interconnects the first terminal of the rectifier to the external alternating current power source. The filter capacitor has a first terminal connected electrically to the first node, and a second terminal connected electrically to the grounded node. The limiting resistor has a first terminal connected electrically to the first node, and a second terminal connected electrically to a second node. The unregulated direct current voltage is provided to the direct current brushless fan motor through the second terminal of the limiting resistor and the grounded node.

Although the conventional power converter module achieves its intended purpose, the unregulated direct current voltage provided thereby does not permit normal and stable operation of the direct current brushless fan motor, which shortens the service life of the latter.

SUMMARY OF THE INVENTION

Therefore, the object of the present invention is to provide a power converter module that has a voltage regulating circuit so as to overcome the aforesaid drawback of the prior art.

According to the present invention, a power converter module, which is adapted to provide a regulated direct current voltage to a load, comprises a rectifier, a metal thin film resistor, and a voltage regulating circuit. The rectifier has first and second rectifier terminals adapted to be coupled electrically to an external alternating current power source, a third rectifier terminal connected electrically to a first node, and a fourth rectifier terminal connected electrically to a grounded node. The metal thin film capacitor is adapted to interconnect one of the first and second rectifier terminals of the rectifier to the external alternating current power source. The voltage regulating circuit is adapted to interconnect the rectifier to the load, and includes a limiting resistor, a filter capacitor, and a voltage regulator. The limiting resistor has a first resistor terminal connected electrically to the first node, and a second resistor terminal connected electrically to a second node. The filter capacitor has a first capacitor terminal connected electrically to a third node, and a second capacitor terminal connected electrically to the grounded node. The voltage regulator interconnects the second and third nodes, and has a regulator terminal connected electrically to the grounded node. The regulated direct current voltage is provided to the load through the third and grounded nodes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
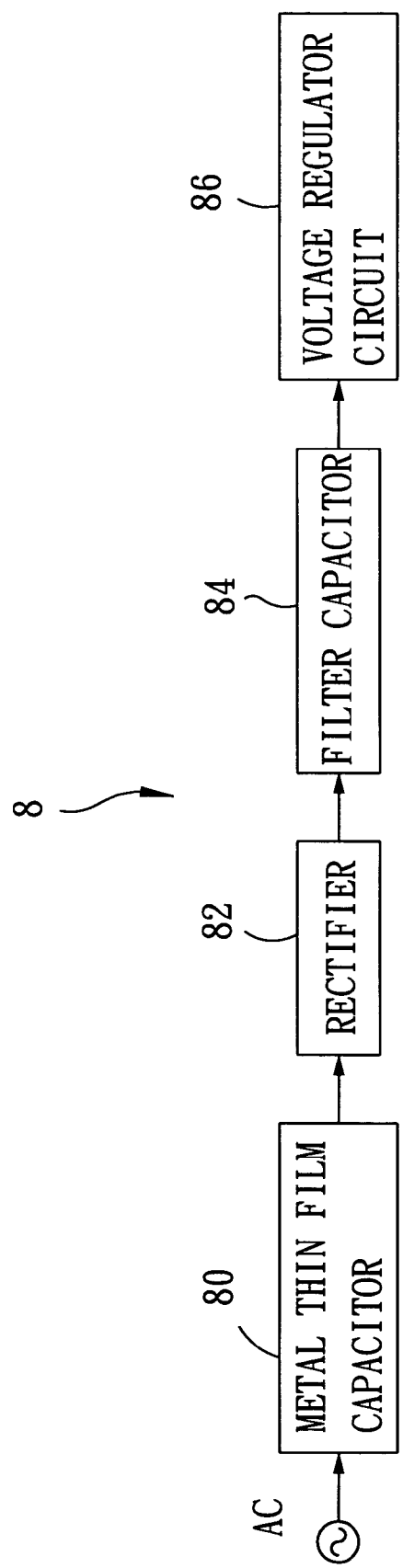
FIG. 1 is a schematic circuit block diagram of the first preferred embodiment of a power converter module according to the present invention.

Before the present invention is described in greater detail, it should be noted that like elements are denoted by the same reference numerals throughout the disclosure.

Figure 2:
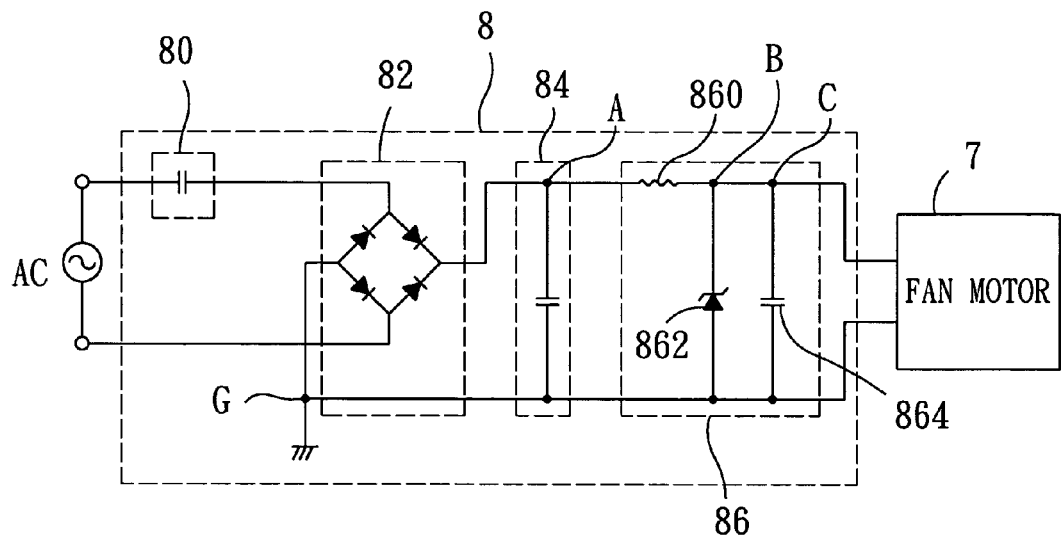
FIG. 2 is a schematic electrical circuit diagram of the first preferred embodiment.
Figure 3:
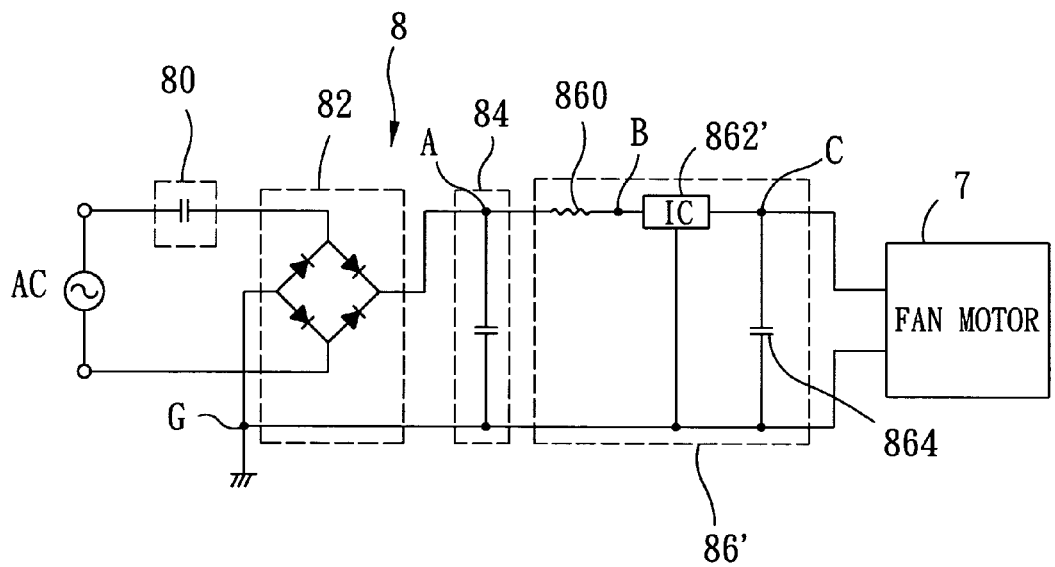
FIG. 3 is a schematic electrical circuit diagram of the second preferred embodiment of a power converter module according to the present invention.

Referring to FIGS. 1 and 2, the first preferred embodiment of a power converter module 8 according to this invention is shown to include a rectifier 82, a metal thin film capacitor 80, and a voltage regulating circuit 86.

The power converter module 8 of this embodiment is adapted to provide a regulated direct current voltage to a direct current brushless fan motor 7.

The rectifier 82 has first and second rectifier terminals adapted to be coupled electrically to an external alternating current power source (AC), a third rectifier terminal connected electrically to a first node (A), and a fourth rectifier terminal connected electrically to a grounded node (G). The alternating current power source (AC) provides an alternating current voltage that is rectified by the rectifier 82 to produce a ripple voltage across the first and grounded nodes (A), (G). In this embodiment, the rectifier 82 is a full-wave diode bridge rectifier.

The metal thin film capacitor 80 has first and second capacitor terminals, and is adapted to interconnect the first rectifier terminal of the rectifier 82 to the external alternating current power source (AC). The alternating current voltage that is provided by the external alternating current power source (AC) is reduced by the metal thin film capacitor 80 before being applied to the rectifier 82. Preferably, the metal thin film capacitor 80 is made from zinc. Each of the first and second capacitor terminals of the metal thin film capacitor 80 is made from silver plated copper.

The power converter module 8 further includes a filter capacitor 84 that has a first capacitor terminal connected electrically to the first node (A), and a second capacitor terminal connected electrically to the grounded node (G). The ripple voltage produced by the rectifier 82 is filtered by the filter capacitor 84 to result in an unregulated direct current voltage across the first and grounded nodes (A), (G).

The voltage regulating circuit 86 is adapted to interconnect the rectifier 82 to the direct current brushless fan motor 7, and includes a limiting resistor 860, a filter capacitor 864, and a voltage regulator 862.

The limiting resistor 860 has a first resistor terminal connected electrically to the first node (A), and a second resistor terminal connected electrically to a second node (B).

The filter capacitor 864 has a first capacitor terminal connected electrically to a third node (C), and a second capacitor terminal connected electrically to the grounded node (G).

The voltage regulator 862 has a first regulator terminal that is connected to the second and third nodes (B), (C), and a second regulator terminal that is connected electrically to the grounded node (G). The unregulated direct current voltage is regulated by the voltage regulating circuit 86 to result in the regulated direct current voltage across the third and grounded nodes (C), (G). In this embodiment, the voltage regulator 862 is a Zener diode.

The regulated direct current voltage is provided to the direct current brushless fan motor 7 through the third and grounded nodes (C), (G).

It is noted that the unregulated direct current voltage at the input side of the voltage regulating circuit 86 is reduced by the limiting resistor 860 before being applied to the voltage regulator 862. Noise present in the regulated direct current voltage is filtered out by the filter capacitor 864 before being provided to the direct current brushless fan motor 7.

Additionally, by virtue of the low dissipation factor of the metal thin film capacitor 80, the metal thin film capacitor 80 does not overheat. Moreover, since the alternating current voltage is reduced by the metal thin film capacitor 80, the limiting resistor 860 is prevented from burning out. Further, when the direct current brushless fan motor is unable to rotate for some reason while in operation, the metal thin film capacitor 80 reduces the alternating current voltage in half. Accordingly, the unregulated direct current voltage is also reduced in half. As such, the direct current brushless fan motor 7 is prevented from burning out.

Referring to FIG. 6, in a modified embodiment of a power converter module 8 according to this invention, the voltage regulator 862' of the voltage regulating circuit 86' has an input terminal that is connected electrically to the second node (B), an output terminal that is connected electrically to the third node (C), and a ground terminal that is connected electrically to the grounded node (G). In this embodiment, the voltage regulator 862' is an integrated circuit. Depending on the required regulated direct current voltage of the direct current brushless fan motor 7, a voltage regulator 862' of type LM7805, LM7812 or LM7824 may be used.

It has thus been shown that the power converter module 8 of this invention includes a voltage regulating circuit 86, 86'. The voltage regulating circuit 86, 86' provides a regulated direct current voltage to a load, such as a direct current brushless fan motor 7, regardless of fluctuations in the alternating current voltage from an external alternating current power source (AC). As such, stable and normal operation of the direct current brushless fan motor 7 can be ensured so that the service life of the same is not affected adversely.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power converter module adapted to provide a regulated direct current voltage to a load, said power converter module comprising:

a rectifier having first and second rectifier terminals adapted to be coupled electrically to an external alternating current power source, a third rectifier terminal connected electrically to a first node, and a fourth rectifier terminal connected electrically to a grounded node;

a metal thin film capacitor adapted to interconnect one of said first and second rectifier terminals of said rectifier to the external alternating current power source; and a voltage regulating circuit adapted to interconnect said rectifier to the load, said voltage regulating circuit including a limiting resistor having a first resistor terminal connected electrically to said first node, and a second resistor terminal connected electrically to a second node, a first filter capacitor having a first capacitor terminal connected electrically to a third node, and a second capacitor terminal connected electrically to said grounded node, and a voltage regulator interconnecting said second and third nodes, and having a regulator terminal connected electrically to said grounded node, wherein the regulated direct current voltage is provided to the load through said third and grounded nodes.

2. The power converter module as claimed in claim 1, further comprising a second filter capacitor that has a first capacitor terminal connected electrically to said first node, and a second capacitor terminal connected electrically to said grounded node.

3. The power converter module as claimed in claim 1, wherein said voltage regulator is a Zener diode.

4. The power converter module as claimed in claim 1, wherein said voltage regulator is an integrated circuit.

5. The power converter module as claimed in claim 1, wherein said metal thin film capacitor is made from zinc.

6. The power converter module as claimed in claim 1, wherein said metal thin film capacitor has first and second capacitor terminals, each of said first and second capacitor terminals of said metal thin film capacitor being made from silver plated copper.

7. The power converter module as claimed in claim 1, wherein said rectifier is a full-wave diode bridge rectifier.

8. A fan assembly comprising:

a direct current brushless fan motor; and a power converter module for providing a regulated direct current voltage to said direct current brushless fan motor, said power converter module including:

a rectifier having first and second rectifier terminals adapted to be coupled electrically to an external alternating current power source, a third rectifier terminal connected electrically to a first node, and a fourth rectifier terminal connected electrically to a grounded node;

a metal thin film capacitor adapted to interconnect one of said first and second rectifier terminals of said rectifier to the external alternating current power source; and a voltage regulating circuit adapted to interconnect said rectifier to said direct current brushless fan motor, said voltage regulating circuit including a limiting resistor having a first resistor terminal connected electrically to said first node, and a second resistor terminal connected electrically to a second node, a first filter capacitor having a first capacitor terminal connected electrically to a third node, and a second capacitor terminal connected electrically to said grounded node, and a voltage regulator interconnecting said second and third nodes, and having a regulator terminal connected electrically to said grounded node, wherein the regulated direct current voltage is provided to said direct current brushless fan motor through said third and grounded nodes.

* * * * *